Patented Oct. 3, 1944

2,359,388

UNITED STATES PATENT OFFICE 2,359,388

METHOD OF PREPARING PERTUSSIS TOXIN AND TOXOID

Merritt E. Roberts and Edwin F. Voigt, Pearl River, N. Y., assignors to Lederle Laboratories, Inc., New York, N. Y., a corporation of Delaware No Drawing. Application February 13, 1941, Serial No. 378,772

7 Claims. (Cl. 167—78)

This invention relates to pertussis toxin and toxoid and to methods of preparing the same.

The study of whooping cough from a scientific as well as clinical standpoint has been carried out by many workers with generally indifferent success. The production of a relatively stable antigen suitable for use in immunization against whooping cough and for the treatment thereof has been the subject of extensive research. The need for such materials is apparent in view of the prevalency of this common ailment. The production of such a material capable of stimulating measurable antibodies has been especially desirable.

We have discovered a method of preparing pertussis toxin and toxoid which products have been found effective in their ability to stimulate the production of titrable antibodies in the human being. The production of toxin is accomplished by growing suitable cultures of Bacteriaceae *Hemophilus pertussis* under properly controlled conditions and in suitable media from which a potent toxin can be obtained. This potent toxin can be suitably detoxified with preservation of antigen to give the corresponding toxoid.

The following specific example is given merely by way of illustration and not in limitation:

A suitable culture medium for the production of potent toxin is prepared by adding to a beef heart infusion base, about 2% peptone, about 0.05% gastric mucin, 0.1% soluble starch (e. g. potato starch), 0.5% sodium chloride and 0.05% disodium phosphate. The pH of this solution is adjusted to 7.8 and the medium is then placed in suitable containers. Thus we may use five-liter lots in nine-liter bottles, giving a culture medium between about 5" and 9" in depth. The culture medium is sterilized by placing the container and medium in a suitable autoclave or the like and heating for a suitable period of time at a sterilizing temperature.

Two-day old seed culture of *H. pertussis* is washed off a blood agar slant and inoculated into the sterilized medium in the bottles. The air in the bottles is displaced by a mixture of about 20% carbon dioxide and 80% oxygen and a similar mixture is passed through the culture medium during the growing period which last from four to ten days at about 32°–37° C. At that time the contents of the bottle are removed and subjected to centrifugation to separate the growth from the toxin solution. The clear solution so obtained is filtered in a Berkefeld filter. The filtrate constitutes the toxin and when it is to be used as such, it is best stored at low temperatures. The toxin can be left for months without deterioration in the frozen and dried state. Subjecting the toxin to a temperature of 50° C. for nine minutes destroys its potency and, at higher temperatures, destruction takes place in shorter periods of time. These properties as well as tests made on rabbits and mice indicate that this product is apparently a true antigenic toxin and not an endotoxin, a non-antigenic toxic substance.

In order to prepare a toxoid of maximum antigenicity from the toxin just described, we add formalin in a suitable amount dependent upon the strength of the toxin. As illustrative, about .3% (by volume) formalin (40% formaldehyde solution) may be added to the unpreserved toxin prepared as described above and this mixture is then incubated at a temperature of about 40° C. for four to seven days. The toxin may be changed to toxoid by heating it alone at 40° C. for twenty-four hours or for six hours at the same temperature if .01% merthiolate is used. These toxoids may be preserved against bacterial infection by the further addition of suitable preservative materials if necessary.

The pertussis toxin prepared as described above has been found to be neutralized by the antibodies in serum from children who have recovered from whooping cough. The pertussis toxoid may be used for immunization against whooping cough or for the treatment thereof. This toxoid stimulates the production of antibodies in the blood of a child so that his serum will neutralize pertussis toxin.

The atmosphere in which the incubation and growth takes place is preferably one containing a mixture of carbon dioxide and oxygen in suitable quantities although the proportions thereof are not necessarily limited to those given in the specific example. However, the growth may take place in the presence of ordinary air, although toxins of lower potency are generally obtained, when compared with cultures maintained for the same periods of time in the atmosphere containing carbon doxide.

The time and temperature for incubation are also subject to some variation although the times stated are considered the optimum. While longer periods of time may be utilized for the incubation, such extended periods may cause undesirable side reactions with the formation of autolytic products which are considered undesirable.

Our toxin and toxoid have proved themselves effective in tests on rabbits and human beings. When our toxin is injected intradermally into rabbits, there is produced a characteristic reaction at the site of injection which reaches a maximum in about seventy-two hours. The undiluted toxin causes necrosis somewhat similar to that produced by the injection of whole cultures. The toxoid produced by our detoxification treatment, upon injection into rabbits, produces antibodies which neutralize pertussis toxin, as evidenced by injections of such toxin. Our toxoid stimulates production of neutralizing antibodies for the necrotic factor of whole cultures as evidenced by the lack of necrosis when live cultures are injected into rabbits previously immunized with toxoid. It is evident that our toxoid injections stimulate the production of a true antitoxin.

The composition of the culture medium used for the production of the pertussis toxin need not be restricted to all of the specific materials and proportions stated in the example. In place of the beef heart infusion, any other suitable meat infusion may be used such as beef infusion, horse infusion and the like, or this may be omitted entirely. The nature of the nutrient medium may account for variability in yield of toxin, it being found that the beef heart infusion is generally preferred since it gives constant and high yields of toxin. The soluble starch and peptone are important ingredients although the exact nature and degree of purity of these materials may be varied somewhat. The chloride and phosphate assist somewhat in the production of the toxin but may be varied in amount or, if desired, may even be omitted entirely. The preferred composition of the culture medium should be such that maximum production of toxin is obtained with the minimum amount of nutrient material, at the same time avoiding any undesirable extraneous materials which may cause non-specific reactions and/or may be difficult to remove or separate from the toxin.

Our pertussis toxin may be tested to determine its potency. As a standard, the potency may be expressed as units M. L. D. (minimum lethal dose). One M. L. D. of pertussis toxin is that amount of toxin which, when administered intravenously in white mice of 16 to 18 grams weight, will cause death within four days in at least one half of the total number of mice injected. Usually six mice are used for each test. The toxin prepared in accordance with the present procedure averages about 50 units M. L. D. or, in other words, 1 part of our toxin may be diluted to $^1/_{50}$ of its strength and the diluted solution will be sufficiently potent to kill at least three mice out of six injected intravenously with this solution in accordance with the test just described. It is to be understood, of course, that the amount injected in each case is exactly the same throughout these tests and determinations.

Our toxin solutions may be concentrated by any suitable method such as by ultra-filtration, chemical precipitation or the like to give a product which contains as much as 1000 units M. L. D. In the ultra-filtration concentration procedure, the toxin remains behind on the membrane and may be recovered therefrom, while a large part of the non-protein constituents such as peptone, pass through the membrane.

In patent application of Voigt and Phillips Serial No. 159,912, filed August 19, 1937, now Patent No. 2,240,969 dated May 6, 1941, there is described and claimed a related method for the production of pertussis toxin and toxoid and these products have been proved clinically to be effective. The present process is an improvement on the process described in that application and permits the preparation of more concentrated toxins and consequently stronger toxoids. As already noted, the toxin solutions prepared in accordance with the present process average about 50 units M. L. D. without concentration. The Voigt and Phillips process results in a toxin containing about 10 to 20 units M. L. D. It will be obvious that the more potent toxin has many advantages and is more desirable than the less potent material. This is especially true when the toxin is converted to the corresponding toxoid and this toxoid is utilized in the formation of a pertussis antitoxin. However, this antitoxin is more particularly described and claimed in copending application of Roberts and Ospeck, Serial No. 381,664 filed March 4, 1941.

The pertussis toxin made can be standardized by using this aforementioned antitoxin. Standardization is carried out by determining the amount of toxin which is neutralized by a designated amount of a standard, stable antitoxin. Neutralization is determined by injection of titrated mixtures of different amounts of toxin with a fixed amount of antitoxin into the skin of susceptible animals (e. g. rabbits) to find the point at which there is no specific toxin lesion. The mixture which gives this effect indicates the neutralization value of the toxin. This test is considered quite accurate since the antitoxin is a stable standard and since the skin test is effective with relatively small amounts of toxin. Mice can be used for the same purpose provided enough excess toxin is added to the neutralization mixture to insure one or more M. L. D.'s of unneutralized toxin. The rabbit intradermal test will detect about .025 to .05 M. L. D. of unneutralized toxin.

The toxoids of the present invention have been found to be valuable antigens for the immunization against whooping cough or for treatment of the disease. The amount of toxoid injected varies in accordance with the relative potency of the toxoid. The antibody response in children, for instance, depends on the relative potency and amount of toxoid injected. We have found that injection of our toxoid causes substantially no undesirable reaction in the child except for an occasional and negligible rise in body temperature. As illustrative of the dosage, a toxoid prepared from our toxin containing 100 units M. L. D., may be administered in two injections, 1 cc. in each arm. The injection is preferably repeated two or three more times at one week intervals, making a total of three or four injections in each arm. After such treatment it is found that the normal child has 6 to 10 protection units per cc. of blood and this is believed to be significant in view of the fact that normal children have 0.4 or less protection units per cc. of blood and children convalescing from the disease pertussis have from 3 to 5 protection units per cc. of blood.

Other suitable changes and variations may be made in carrying out our invention without departing from the spirit and scope thereof as defined in the appended claims.

We claim:

1. The process which comprises growing a culture of pertussis bacilli in a deep culture medium of about pH 7.4–7.8 containing small amounts of soluble starch and peptone, passing a stream of gas containing carbon dioxide through the medium while maintaining the medium at a temperature of about 32°–37° C. for about four to ten days until maximum formation of pertussis toxin is obtained without formation of substantial amounts of autolytic products.

2. The process which comprises growing a culture of pertussis bacilli in a deep culture medium of about pH 7.4–7.8 containing small amounts of soluble starch and peptone, passing a stream of gas containing carbon dioxide through the medium while maintaining the medium at a temperature of about 32°–37° C. for about four to ten days until maximum formation of pertussis toxin is obtained without the formation of substantial amounts of autolytic products, separating the toxin solution from the medium and detoxifying the toxin.

3. The process which comprises growing a culture of pertussis bacilli in a deep culture medium of about pH 7.4–7.8 containing small amounts of soluble starch and peptone, passing a stream of gas containing carbon dioxide through the medium while maintaining the medium at a temperature of about 32°–37° C. for about four to ten days until maximum formation of pertussis toxin is obtained without the formation of substantial amounts of autolytic products, separating the toxin solution from the medium and detoxifying the toxin by adding a small amount of formaldehyde thereto and heating at about 40° C. for about one week.

4. The process which comprises growing a culture of pertussis bacilli in a deep culture medium of about pH 7.4–7.8 containing meat infusion together with small amounts of soluble starch and peptone, passing a stream of gas containing a substantial amount of carbon dioxide through the medium while maintaining the medium at a temperature of about 32°–37° C. for about four to ten days until maximum formation of pertussis toxin is obtained without the formation of substantial amounts of autolytic products.

5. The process which comprises growing a culture of pertussis bacilli in a deep culture medium of about pH 7.4–7.8 containing meat infusion together with small amounts of soluble starch and peptone, passing a stream of gas containing carbon dioxide through the medium while maintaining the medium at a temperature of about 32°–37° C. for about four to ten days until maximum formation of pertussis toxin is obtained without the formation of substantial amounts of autolytic products, separating the toxin solution from the medium and detoxifying the toxin by adding a small amount of formaldehyde thereto and heating at about 40° C. for about one week.

6. The process which comprises growing a culture of pertussis bacilli in a deep culture medium of about pH 7.4–7.8 containing meat infusion together with small amounts of soluble starch and peptone, passing a stream of gas containing carbon dioxide through the medium while maintaining the medium at a temperature of about 32°–37° C. for about four to ten days until maximum formation of pertussis toxin is obtained without the formation of substantial amounts of autolytic products, separating the toxin solution from the medium and detoxifying the toxin.

7. The process which comprises growing a culture of pertussis bacilli in a deep culture medium of about pH 7.4–7.8 containing beef heart infusion together with small amounts of soluble starch and peptone, passing a stream of gas containing carbon dioxide through the medium while maintaining the medium at a temperature of about 32°–37° C. for about four to ten days until maximum formation of pertussis toxin is obtained without the formation of substantial amounts of autolytic products, separating the toxin solution from the medium and detoxifying the toxin by adding a small amount of formaldehyde thereto and heating at about 40° C. for about one week.

MERRITT E. ROBERTS.
EDWIN F. VOIGT.